(12) United States Patent
Qu

(10) Patent No.: US 11,947,102 B2
(45) Date of Patent: Apr. 2, 2024

(54) HIGH-DEFINITION INTELLIGENT INTEGRATED CONDUIT DETECTOR

(71) Applicant: SHENZHEN WOPSON ELECTRICAL CO., LTD, Guangdong (CN)

(72) Inventor: Haibin Qu, Guangdong (CN)

(73) Assignee: SHENZHEN WOPSON ELECTRICAL CO., LTD., Shenzhen (CN)

( * ) Notice: Subject to any disclaimer, the term of this patent is extended or adjusted under 35 U.S.C. 154(b) by 220 days.

(21) Appl. No.: 17/606,717

(22) PCT Filed: Nov. 12, 2019

(86) PCT No.: PCT/CN2019/117533
§ 371 (c)(1),
(2) Date: Oct. 26, 2021

(87) PCT Pub. No.: WO2020/224214
PCT Pub. Date: Nov. 12, 2020

(65) Prior Publication Data
US 2022/0229283 A1    Jul. 21, 2022

(30) Foreign Application Priority Data

May 7, 2019   (CN) .......................... 201920642435.4

(51) Int. Cl.
*G02B 23/24*     (2006.01)
*G01N 21/954*    (2006.01)
(Continued)

(52) U.S. Cl.
CPC ....... *G02B 23/2484* (2013.01); *G01N 21/954* (2013.01); *G02B 23/2476* (2013.01);
(Continued)

(58) Field of Classification Search
CPC ............ G02B 23/2484; G02B 23/2476; G01N 21/954; G01N 2021/9542; F16L 55/30;
(Continued)

(56) References Cited

U.S. PATENT DOCUMENTS 7,232,481 B1    6/2007   Chou
8,540,429 B1    9/2013   Olsson et al.
(Continued)

FOREIGN PATENT DOCUMENTS

CN    201965094    9/2011
CN    203422482    2/2014
(Continued)

OTHER PUBLICATIONS

International Searching Authority, "International Search Report," issued in connection with International Patent Application No. PCT/CN2019/117533, dated Feb. 21, 2020, 8 pages (English Translation Included).

(Continued)

*Primary Examiner* — Minh Q Le
(74) *Attorney, Agent, or Firm* — Loeb & Loeb LLP

(57) ABSTRACT

The application provides a high-definition intelligent integrated conduit detector, including a box body and a bracket. A front side of the box body is provided with a front mounting groove, a back side of the box body is provided with a back mounting groove, a waterproof keyboard and a control terminal are installed in the front mounting groove, a counter and a hard cable coil are installed in the back mounting groove, one end of the hard cable coil is connected with the control terminal, the other end of the hard cable coil is connected with a high-definition camera, the front side of the box body is rotatably connected with a front cover, the back side of the box body is connected with a back cover, (Continued)

and the box body is rotatably connected with the bracket through a strong resistance rotating shaft.

20 Claims, 4 Drawing Sheets

(51) Int. Cl.
| | |
|---|---|
| *E03F 7/12* | (2006.01) |
| *F16L 55/30* | (2006.01) |
| *F16M 13/00* | (2006.01) |
| *F17D 5/02* | (2006.01) |
| *G01D 21/00* | (2006.01) |

(52) U.S. Cl.
CPC ................ *E03F 7/12* (2013.01); *F16L 55/30* (2013.01); *F16M 13/00* (2013.01); *F17D 5/02* (2013.01); *G01D 21/00* (2013.01); *G01N 2021/9542* (2013.01)

(58) Field of Classification Search
CPC .. E03F 7/12; F16M 13/00; F17D 5/02; G01D 21/00
USPC ........................ 137/15.11; 348/45, 65, 73, 76
See application file for complete search history.

(56) References Cited

U.S. PATENT DOCUMENTS

| | | | | |
|---|---|---|---|---|
| 8,556,799 | B2* | 10/2013 | Iwasaki ................ | A61B 1/0055 |
| | | | | 396/17 |
| 9,222,809 | B1* | 12/2015 | Olsson ................... | G01D 11/30 |
| 9,658,445 | B2* | 5/2017 | Yamamoto ......... | G02B 23/2476 |
| 9,769,366 | B2 | 9/2017 | Olsson | |
| 10,001,425 | B1* | 6/2018 | Olsson ................. | G03B 17/561 |
| 2003/0052967 | A1* | 3/2003 | Brunton ................ | B65H 75/40 |
| | | | | 348/E7.086 |
| 2005/0085690 | A1* | 4/2005 | Tien ................... | A61B 1/00105 |
| | | | | 348/E7.087 |
| 2008/0226717 | A1 | 9/2008 | Oury | |
| 2011/0143009 | A1 | 6/2011 | Tuason | |
| 2013/0342667 | A1* | 12/2013 | Miyayashiki ............ | A61B 1/05 |
| | | | | 348/E7.085 |
| 2014/0204197 | A1 | 7/2014 | Olsson | |
| 2014/0302125 | A1 | 10/2014 | Kodgule | |
| 2014/0340505 | A1* | 11/2014 | Olsson ................... | H04N 23/66 |
| | | | | 348/84 |
| 2015/0055005 | A1* | 2/2015 | Olsson ................... | H04N 23/54 |
| | | | | 348/333.06 |
| 2015/0101896 | A1 | 4/2015 | Kleyn | |
| 2017/0374292 | A1* | 12/2017 | Motoki ................ | H04N 23/635 |
| 2018/0031166 | A1* | 2/2018 | Urbanski ................ | F16L 55/26 |
| 2018/0227476 | A1* | 8/2018 | Kobayashi ........... | H04N 25/531 |
| 2018/0296063 | A1* | 10/2018 | Motoki ................ | A61B 1/0004 |
| 2021/0278660 | A1* | 9/2021 | Olsson ............... | G02B 23/2446 |
| 2021/0386508 | A1* | 12/2021 | Jackson ................ | A61B 1/125 |
| 2022/0107552 | A1* | 4/2022 | Rubens ................. | F16M 13/00 |

FOREIGN PATENT DOCUMENTS

| | | |
|---|---|---|
| CN | 104937615 | 9/2015 |
| CN | 204613427 | 9/2015 |
| CN | 109068093 | 12/2018 |
| CN | 109291032 | 2/2019 |
| CN | 208707802 | 4/2019 |
| KR | 100786492 | 12/2007 |
| WO | 2004026263 | 4/2004 |
| WO | 2004048267 | 6/2004 |
| WO | 2013052114 | 4/2013 |

OTHER PUBLICATIONS

International Searching Authority, "Written Opinion," issued in connection with International Application Patent Application No. PCT/CN2019/117533, dated Feb. 21, 2020, 3 pages.

Korean Office Action issued in KR20217000068, dated Nov. 23, 2023, 6 pages.

\* cited by examiner

HIGH-DEFINITION INTELLIGENT INTEGRATED CONDUIT DETECTOR

CROSS-REFERENCE TO RELATED APPLICATION

The present application claims priority of Chinese Patent Application No. 201920642435.4 filed on May 7, 2019 with the name of "high-definition intelligent integrated conduit detector", and the entire content disclosed by the Chinese patent application is incorporated herein by reference as part of the present application.

TECHNICAL FIELD

The embodiments of the present disclosure relate to a conduit detector, in particular to a high-definition intelligent integrated conduit detector.

BACKGROUND

Most of the conduit detectors in related technologies are of split structure, which is inconvenient to carry.

SUMMARY

In order to solve the problem in the related technology, the application provides a high-definition intelligent integrated conduit detector.

The application provides a high-definition intelligent integrated conduit detector, comprising a box body and a bracket. A front side of the box body is provided with a front mounting groove, a back side of the box body is provided with a back mounting groove, a waterproof keyboard and a control terminal are installed in the front mounting groove of the box body, a counter and a hard cable coil are installed in the back mounting groove of the box body, one end of the hard cable coil is connected with the control terminal through a waterproof joint, the other end of the hard cable coil is connected with a high-definition camera, the high-definition camera is located outside the box body, the front side of the box body is rotatably connected with a front cover, and the front cover is matched with the front mounting groove, the back side of the box body is connected with a back cover through a fastener, and the back cover is matched with the back mounting groove, and the box body is rotatably connected with the bracket through a strong resistance rotating shaft.

As a further improvement of the application, the waterproof keyboard is connected with the front mounting groove through a Z-shaped bracket, and the control terminal is connected with the front mounting groove through a Z-shaped bracket.

As a further improvement of the application, the box body is connected with a compass.

As a further improvement of the application, a wire clamping device is installed in the back mounting groove of the box body.

As a further improvement of the application, a corner of the box body is connected with a corner protection silica gel.

As a further improvement of the application, a corner of the bracket is connected with a bracket corner protection silica gel.

As a further improvement of the application, the control terminal comprises a terminal front cover and a terminal rear cover, the terminal front cover and the terminal rear cover are engaged with each other, a terminal installation cavity is provided between the terminal front cover and the terminal rear cover, a main board, a display screen, and a mask are installed in the terminal installation cavity, and the mask, the display screen, and the main board are stacked from top to bottom.

As a further improvement of the application, a front side of the terminal front cover is pasted with a face sticker.

As a further improvement of the application, a back side of the terminal rear cover is connected with a battery and a battery cover.

As a further improvement of the application, the counter comprises a counting box main body and a counting assembly fixed on the counting box main body, the counting assembly comprises a rotating wheel for pressing a hard wire, and the rotating wheel is rotatably connected with the counting box main body, and at least two magnets are installed on the rotating wheel.

The application has the technical effect of adopting an integrated structure and being convenient to carry.

DETAILED DESCRIPTION

The application will be further described below with reference to the drawings and specific implementations.

Figure 1:
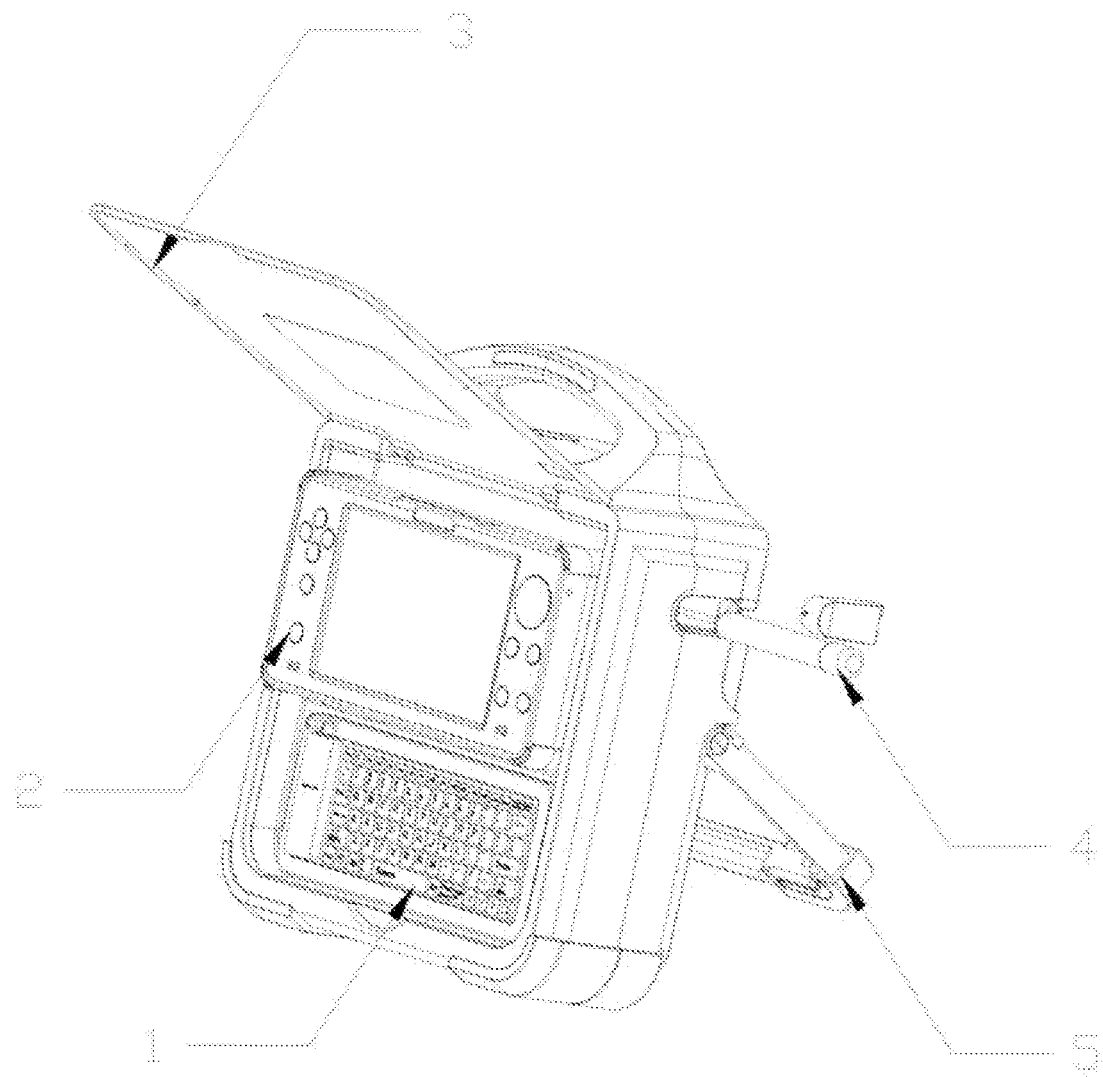
FIG. 1 is a schematic diagram of a high-definition intelligent integrated conduit detector.
Figure 2:
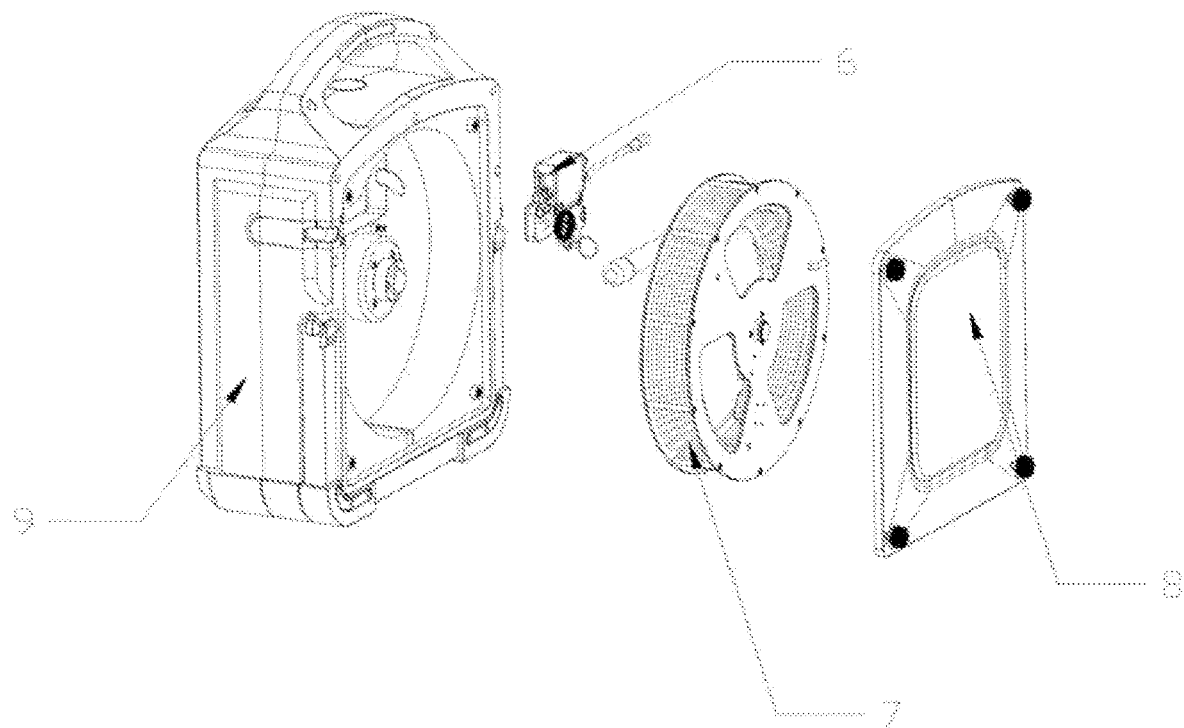
FIG. 2 is an exploded schematic diagram of a high-definition intelligent integrated conduit detector.
Figure 3:
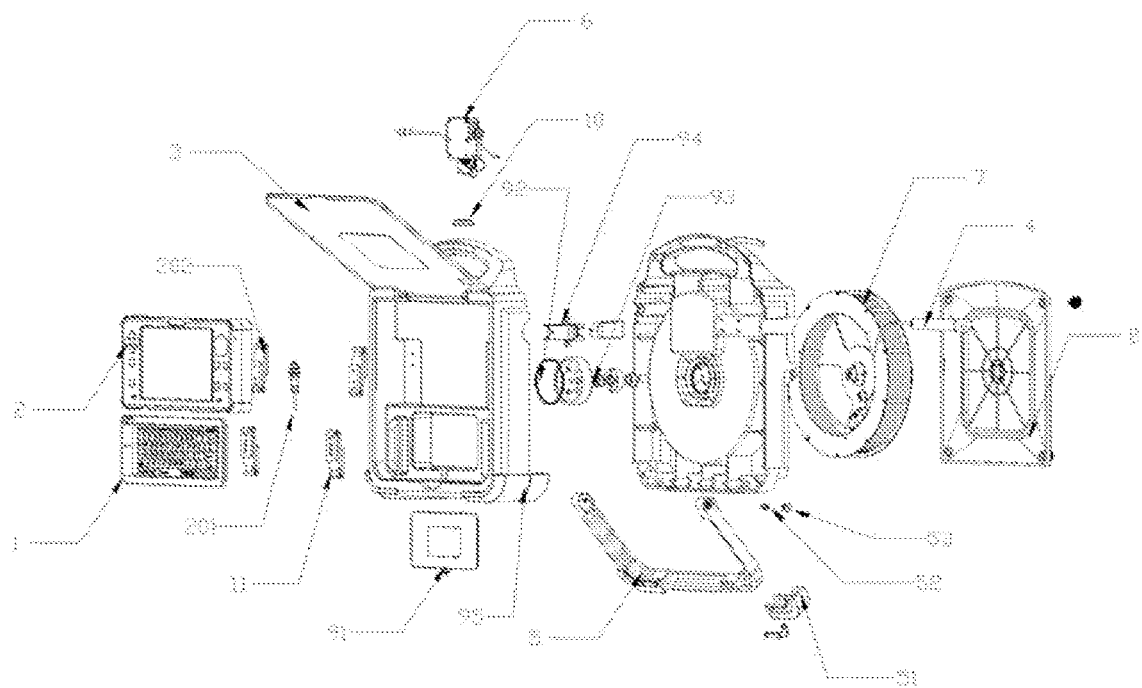
FIG. 3 is an exploded schematic diagram of a high-definition intelligent integrated conduit detector.
Figure 4:
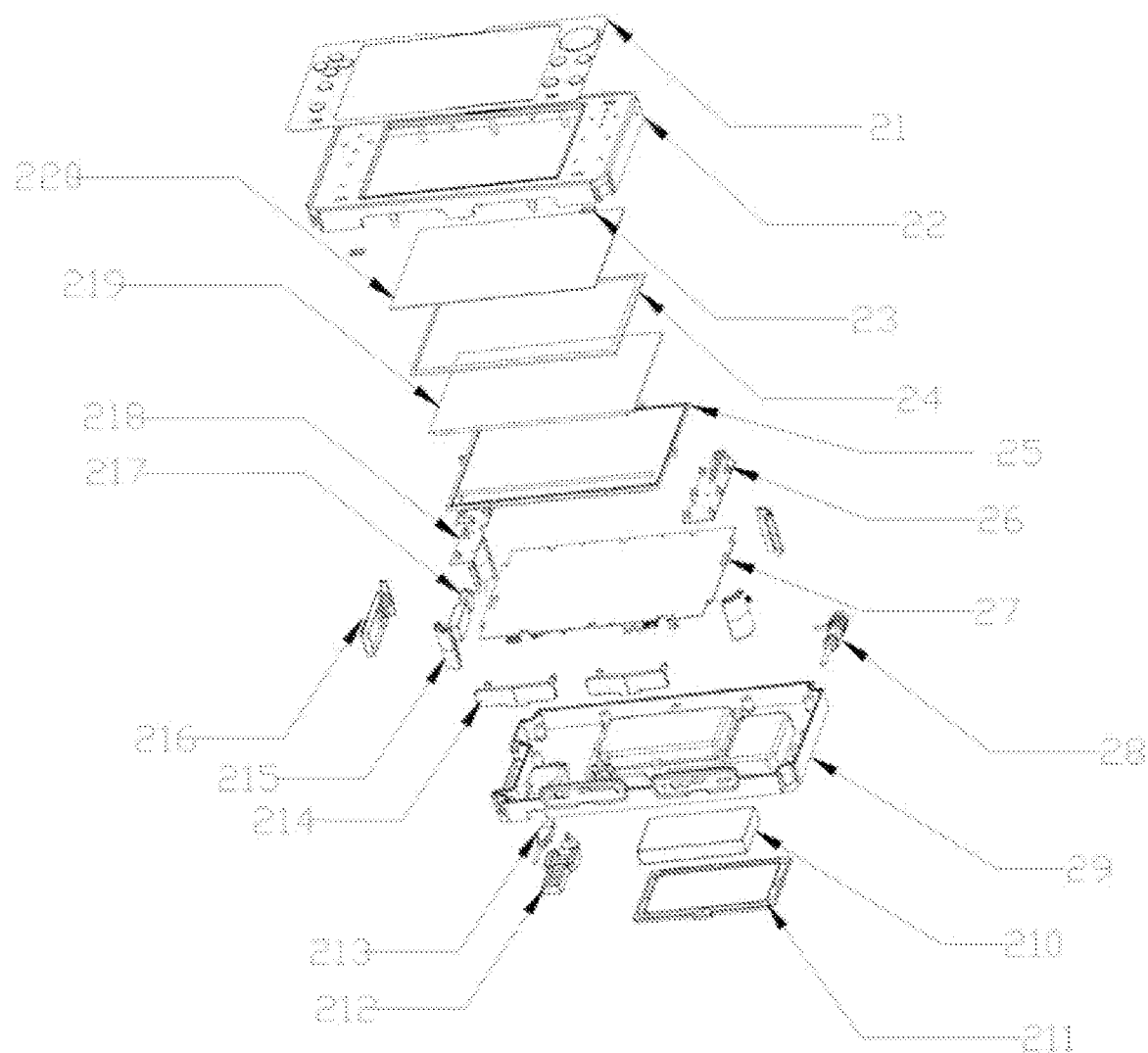
FIG. 4 is an exploded schematic diagram of a control terminal of a high-definition intelligent integrated conduit detector.
Figure 5:
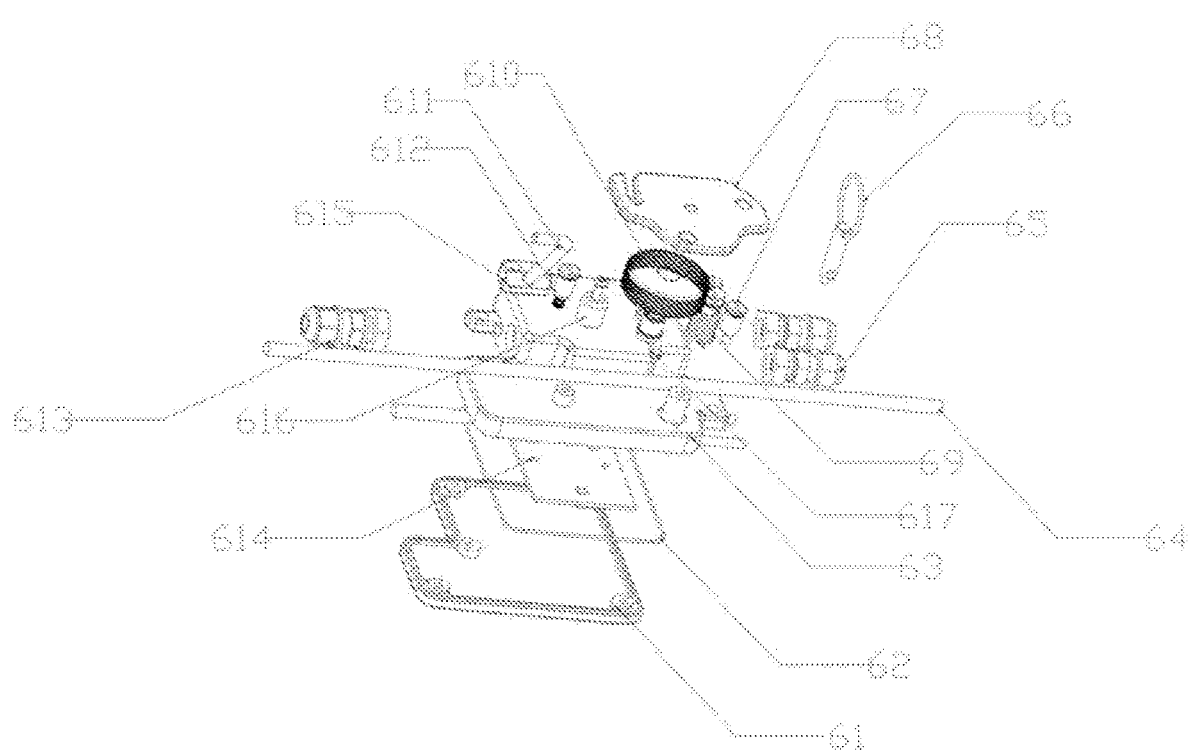
FIG. 5 is an exploded schematic diagram of a counter of a high-definition intelligent integrated conduit detector.

As shown in FIG. 1 to FIG. 5, a high-definition intelligent integrated conduit detector comprises a box body 9 and a bracket 5, a front side of the box body 9 is provided with a front mounting groove, a back side of the box body 9 is provided with a back mounting groove, a waterproof keyboard 1 and a control terminal 2 are installed in the front mounting groove of the box body 9, and a counter 6 and a hard cable coil 7 are installed in the back mounting groove of the box body 9. One end of the hard cable coil 7 is connected with the control terminal 2 through a waterproof joint 201, and the other end of the hard cable coil 7 is connected with a high-definition camera 4, the high-definition camera 4 is located outside the box body 9. The front side of the box body 9 is rotatably connected with a front cover 3, and the front cover 3 is matched with the front mounting groove, the back side of the box body 9 is connected with a back cover 8 through a fastener, and the back cover 8 is matched with the back mounting groove, and the box body 9 is rotatably connected with the bracket 5 through a strong resistance rotating shaft 52. The box body 9 is mainly composed of a front box body and a rear box body, and the control terminal 2 comprises a displayer and control buttons.

As shown in FIG. 1 to FIG. 5, the waterproof keyboard 1 is connected with the front mounting groove through a Z-shaped bracket 11, and the control terminal 2 is connected with the front mounting groove through a Z-shaped bracket 202.

As shown in FIG. 1 to FIG. 5, the box body 9 is connected with a compass 10.

As shown in FIG. 1 to FIG. 5, a wire clamping device 94 is installed in the back mounting groove of the box body 9.

As shown in FIG. 1 to FIG. 5, a corner of the box body 9 is connected with a corner protection silica gel 95.

As shown in FIG. 1 to FIG. 5, a corner of the bracket 5 is connected with a bracket corner protection silica gel 51.

As shown in FIG. 1 to FIG. 5, the control terminal 2 includes a terminal front cover 22 and a terminal rear cover 29, the terminal front cover 22 and the terminal rear cover 29 are engaged with each other. A terminal installation cavity is provided between the terminal front cover 22 and the terminal rear cover 29, and a main board 27, a display screen 219, and a mask 220 are installed in the terminal installation cavity. The main board 27 is mainly composed of a single chip microcomputer and a peripheral circuit. The mask 220, the display screen 219, and the main board 27 are stacked from top to bottom. A front side of the terminal front cover 22 is pasted with a face sticker 21. A back side of the terminal rear cover 29 is connected with a battery 210 and a battery cover 211. The main board 27 is connected with a waterproof loudspeaker 23. An EAV sticker is provided between the mask 220 and the display screen 219. The display screen 219 is located in the screen stuck frame 25, and the main board 27 is connected with a first button plate 26 and a second button plate 218. The main board 27 is connected with a cable through a waterproof joint 28, and the terminal rear cover 29 is correspondingly connected with a USB interface silica gel cover 212, a keyboard USB interface 213, and an interface silica gel cover 214. The front two corners of the terminal rear cover 29 are sleeved with corner-expanding silica gels 215, and a lateral side of the terminal rear cover 29 is butted with a side USB silica gel cover 216 and a USB adapter 217.

As shown in FIG. 1 to FIG. 5, the hard cable coil 7 (video cable) is connected with the control terminal 2 through the waterproof joint 201, so as to achieve the transmission of an image, a LED lamp control signal, and a counting function. The control terminal 2 may control video recording/one-click photography/volume/video picture zooming/count resetting/counting metric-imperial switching/adjustment of camera LED lamps.

As shown in FIG. 1 to FIG. 5, the terminal front cover 22 of the control terminal 2 uses a face sticker 21 to protect the button holes from dust and water, and at the same time increase the aesthetics of the product.

As shown in FIG. 1 to FIG. 5, the lateral side of the control terminal 2 is equipped with a USB interface, which is convenient for customers to use. A silica gel cover is provided at the interface, which is beneficial to dustproof and waterproof when the product is used.

As shown in FIG. 1 to FIG. 5, a front port and a rear port of the control terminal 2 are soft shrink sealed with silica gel material, thus making the product have a function of dustproof and waterproof.

As shown in FIG. 1 to FIG. 5, the high-definition camera 4 and the hard cable coil 7 are detachably connected with each other. The high-definition camera 4 is fixed by screw connection, and pin-type connection is adopted in the rear cover. The spring connected at the back side of the camera may make the camera pass through a bend pipeline easily. The camera is small and may achieve 38-diameter bend.

As shown in FIG. 1 to FIG. 5, a counter 6 provided in the conduit detector counts by a hall algorithm. The counter 6 is small and has high precision, and may accurately calculate lengths of the hard cable that is pulled out and retracted. The counting precision of the counter is 0.2 m, and the counting error may be negligible. The measurement unit of the counter 6 may be switched between the metric system and the imperial system, and the counter may be reset. The counting result may be displayed on the upper right corner of the displayer, making it convenient to install and disassemble the cable.

As shown in FIG. 1 to FIG. 5, the control terminal 2 adopts a high-definition screen control terminal, the displayer adopts a 10.1-inch screen to better watch the pipeline situation, and the Z-shaped bracket 202 is used for connecting and fixing, so that the control terminal 2 may swing at a plurality of angles, and stop and swing at any time, thus better improving the service performance of the product, and at the same time, the product may also be disassembled to facilitate maintenance.

As shown in FIG. 1 to FIG. 5, on the control, the waterproof keyboard 5 and the industrial ABS mold are matched to form a shell, so that the product is more integrated. The Z-shaped bracket 11 is used to connect and fix, which makes the product swing at a plurality of angles, and stop and swing at any time, thus better improving the service performance of the product, and at the same time, the product may also be disassembled for convenient maintenance.

As shown in FIG. 1 to FIG. 5, the hard cable coil 7 adopts aluminum alloy to assemble the frame, which improves the product precision. At the same time, the hard cable coil 7 is connected with the box body 9 by a plug-in joint 93, which is convenient for disassembly and beneficial to product cleaning and maintenance. A waterproof ring 92 is provided at the joint position, which is beneficial to the waterproofing of the joint after being disassembled.

As shown in FIG. 1 to FIG. 5, after the coil is connected with the high-definition control display through an aviation joint connection line, the camera may be detected and controlled on the high-definition control display, and at the same time, video recording/photographing/image reduction and enlargement/control and adjustment of LED lamp brightness may be performed. The whole system is compact in structure, and is firm and reliable. In addition, the product is easy to carry, flexible to operate, beautiful in appearance, and the terminal waterproof grade is IP65, so that the product has a wider range of applications.

As shown in FIG. 1 to FIG. 5, the product uses a wire clamping device 94 with a round groove on the brake. By using the wire clamping device 94, during the use process, the wire only needs to be pushed forward to make the wire stuck in the round groove, and the wire is fixed by the diameter difference between the round groove and the wire, so as to achieve the braking effect. A device for fixing the camera is provided at the upper end of the brake device, when in use, the camera pops up when pressing the front end of the camera, and when finishing to use, the camera only needs to be stuck in the round hole, because the coil has an outward thrust, the camera may be well stuck in the product.

As shown in FIG. 1 to FIG. 5, the main part of the product adopts a plurality of local circuits for waterproofing, and focusing on waterproofing in the joint part, especially the connection part with the coil. The waterproof ring 92 is added, and the waterproof ring 92 is beneficial to the waterproof of the turntable when the coil rotates. At the same time, the joint adopts the plug-in joint 93, which has better contact performance.

As shown in FIG. 1 to FIG. 5, the bracket 5 is installed on a side of the box body 9, the bracket 5 is connected by a strong resistance rotating shaft 52 and fixed by a plug 53, so that the product may swing at an angle of 90 degrees, and may stop and swing at any time during the swing, which is beneficial to the adjustment of the viewing angle and the stability when the product is used in the vertical mode.

As shown in FIG. 1 to FIG. 5, the rear cover 8 is fixed by turning knurled screws, and adopts the exquisite aluminum alloy material with the silica gel material, so that the product has a better experience in matching and use, and is convenient for installation and disassembly. A bearing is provided on the rear cover to correspond to the bearing on the box body 9, which is beneficial to make the coil and drawing out the coil smoother.

As shown in FIG. 1 to FIG. 5, a compass 10 is added on the upper end of the product, so that the compass may point a direction when an accident occurs during pulling out the coil, and some elements are added to the upper end to make the product more humanized and not single.

As shown in FIG. 1 to FIG. 5, there is a tool cabinet for placing a tool and a power supply in the box body 9, after the tool and the power supply are placed in the tool cabinet, the tool cabinet may be covered by a tool box cover 91, so as to facilitate the storage and use of components.

As shown in FIG. 1 to FIG. 5, the front end of the box body 9 is provided with a front cover 3, which is beneficial to protect the high-definition screen control terminal and the waterproof keyboard 1, so that the product is more integrated, and at the same time, the sun-shading effect is achieved. The blank region of the front cover 3 may be pasted with decorative face stickers, which improves the aesthetics of the product.

As shown in FIG. 1 to FIG. 5, the counter 6 includes a counting box cover 61, a sealing ring 62, a counting box main body 63, a hard cable 64, a waterproof joint nut 65, a marble bolt 66, a wire-protecting wheel shaft rod 67, a rotating plate 68, a torsion spring 69, a rotating wheel 610, a positioning pin 611, a wire-protecting wheel 612, a waterproof joint nut 613, a counting plate 614, a positioning pin seat 615, a guide wheel 616, and a magnet 617. The hard cable 64 is wound to form the hard cable coil 7. The counter 6 may accurately calculate the lengths of the hard cable 64, which is pulled out and retracted by using a composite algorithm, and the counting accuracy of the counter 6 is 0.05 mm. When the hard cable 64 is pulled or pushed, the rotating wheel 610 is driven to rotate. Two magnets 617 are installed on the rotating wheel 610, and the two magnets 617 will trigger the hall device installed on PCB every time the rotating wheel 610 rotates ½, so as to count the length. Clockwise and counterclockwise rotation of the crown block controls the increase and decrease of the length count. At the same time, the product uses the torsion spring 69 and the rotating plate 68 to make the rotating wheel press the hard cable 64 to count accurately.

A working principle of the counter 6: pulling open the marble bolt 66 to make the rotating plate 68 and the rotating wheel 610 rotate, so as to increase the space of the middle clamp cable; then, clamping the hard cable 64 in the wire slot along the positioning pin 611, the wire slot being composed of the wire-protecting wheel shaft rod 67 and the wire-protecting wheel 612; and then, releasing the marble bolt 66 to make the rotating plate 68 and the rotating wheel 610 press the hard cable 64 to make the counter count.

According to the high-definition intelligent integrated conduit detector provided by the application, under the action of a single-chip control program, actions such as pressing the button, electric quantity, counting, typing, and the like are detected and processed; at the same time, a 1080P camera sends the processed video signal to a DVR board; after the DVR board finishes video coding and decoding, the video is sent to a 10-inch display screen for display; and at the same time, the DVR board integrates functions such as reading SD cards or U disks, recording video, recording sound, and taking pictures. The control terminal 2 integrates a power supply voltage stabilizing system, a single chip microcomputer typing and counting processing system, a screen display system, a DVR system, a key system, various interface systems, a character synthesis system, and the like.

The above content is a further detailed description of the application combined with specific optional implementations, and it cannot be considered that the specific implementation of the application is limited to these descriptions. For those of ordinary skill in the technical field to which the application belongs, some simple deductions or substitutions may be made without departing from the concept of this application, which should be regarded as belonging to the protection scope of this application.

What is claimed is:

1. A high-definition intelligent integrated conduit detector, comprising:
a box body and a bracket,
wherein a front side of the box body is provided with a front mounting groove, a back side of the box body is provided with a back mounting groove,
a waterproof keyboard and a control terminal are installed in the front mounting groove of the box body, a counter and a hard cable coil are installed in the back mounting groove of the box body,
one end of the hard cable coil is connected with the control terminal through a waterproof joint, other end of the hard cable coil is connected with a high-definition camera, and the high-definition camera is located outside the box body,
the front side of the box body is rotatably connected with a front cover, and the front cover is matched with the front mounting groove,
the back side of the box body is connected with a back cover through a fastener, and the back cover is matched with the back mounting groove, and
the box body is rotatably connected with the bracket through a strong resistance rotating shaft.

2. The high-definition intelligent integrated conduit detector according to claim 1, wherein the waterproof keyboard is connected with the front mounting groove through a Z-shaped bracket, and the control terminal is connected with the front mounting groove through a Z-shaped bracket.

3. The high-definition intelligent integrated conduit detector according to claim 1, wherein the box body is connected with a compass.

4. The high-definition intelligent integrated conduit detector according to claim 1, wherein a wire clamping device is installed in the back mounting groove of the box body.

5. The high-definition intelligent integrated conduit detector according to claim 1, wherein a corner of the box body is connected with a corner protection silica gel.

6. The high-definition intelligent integrated conduit detector according to claim 1, wherein a corner of the bracket is connected with a bracket corner protection silica gel.

7. The high-definition intelligent integrated conduit detector according to claim 1, wherein the control terminal comprises a terminal front cover and a terminal rear cover,
the terminal front cover and the terminal rear cover are engaged with each other,
a terminal installation cavity is provided between the terminal front cover and the terminal rear cover, a main board, a display screen, and a mask are installed in the terminal installation cavity, and the mask, the display screen, and the main board are stacked from top to bottom.

8. The high-definition intelligent integrated conduit detector according to claim 7, wherein a front side of the terminal front cover is pasted with a face sticker.

9. The high-definition intelligent integrated conduit detector according to claim 7, wherein a back side of the terminal rear cover is connected with a battery and a battery cover.

10. The high-definition intelligent integrated conduit detector according to claim 1, wherein the counter comprises a counting box main body and a counting assembly fixed on the counting box main body, the counting assembly comprises a rotating wheel for pressing the hard cable coil, and the rotating wheel is rotatably connected with the counting box main body, and at least two magnets are installed on the rotating wheel.

11. The high-definition intelligent integrated conduit detector according to claim 2, wherein the control terminal comprises a terminal front cover and a terminal rear cover, the terminal front cover and the terminal rear cover are engaged with each other, a terminal installation cavity is provided between the terminal front cover and the terminal rear cover, a main board, a display screen, and a mask are installed in the terminal installation cavity, and the mask, the display screen, and the main board are stacked from top to bottom.

12. The high-definition intelligent integrated conduit detector according to claim 11, wherein a front side of the terminal front cover is pasted with a face sticker.

13. The high-definition intelligent integrated conduit detector according to claim 11, wherein a back side of the terminal rear cover is connected with a battery and a battery cover.

14. The high-definition intelligent integrated conduit detector according to claim 3, wherein the control terminal comprises a terminal front cover and a terminal rear cover, the terminal front cover and the terminal rear cover are engaged with each other, a terminal installation cavity is provided between the terminal front cover and the terminal rear cover, a main board, a display screen, and a mask are installed in the terminal installation cavity, and the mask, the display screen, and the main board are stacked from top to bottom.

15. The high-definition intelligent integrated conduit detector according to claim 2, wherein the counter comprises a counting box main body and a counting assembly fixed on the counting box main body, the counting assembly comprises a rotating wheel for pressing the hard cable coil, and the rotating wheel is rotatably connected with the counting box main body, and at least two magnets are installed on the rotating wheel.

16. The high-definition intelligent integrated conduit detector according to claim 3, wherein the counter comprises a counting box main body and a counting assembly fixed on the counting box main body, the counting assembly comprises a rotating wheel for pressing the hard cable coil, and the rotating wheel is rotatably connected with the counting box main body, and at least two magnets are installed on the rotating wheel.

17. The high-definition intelligent integrated conduit detector according to claim 2, wherein the box body is connected with a compass.

18. The high-definition intelligent integrated conduit detector according to claim 2, wherein a wire clamping device is installed in the back mounting groove of the box body.

19. The high-definition intelligent integrated conduit detector according to claim 2, wherein a corner of the box body is connected with a corner protection silica gel.

20. The high-definition intelligent integrated conduit detector according to claim 2, wherein a corner of the bracket is connected with a bracket corner protection silica gel.

* * * * *